United States Patent
Hou et al.

(10) Patent No.: US 8,542,707 B2
(45) Date of Patent: Sep. 24, 2013

(54) MULTI-CARRIER SYSTEM SELECTION

(75) Inventors: Jindong Hou, Cambridge (GB);
Andrew Richardson, Cambridge (GB);
Kenneth Jones, Atkinson, NH (US)

(73) Assignee: Airvana LLC, Chelmsford, MA (US)

( * ) Notice: Subject to any disclaimer, the term of this patent is extended or adjusted under 35 U.S.C. 154(b) by 736 days.

(21) Appl. No.: 12/467,913

(22) Filed: May 18, 2009

(65) Prior Publication Data

US 2010/0290389 A1    Nov. 18, 2010

(51) Int. Cl.
*H04W 4/00* (2009.01)
(52) U.S. Cl.
USPC .......................................... 370/491; 370/500
(58) Field of Classification Search
None
See application file for complete search history.

(56) References Cited

U.S. PATENT DOCUMENTS

| | | | |
|---|---|---|---|
| 6,430,168 B1 | 8/2002 | Djurkovic et al. | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,826,370 B1 * | 11/2010 | Vargantwar et al. | 370/235 |
| 7,830,854 B1 * | 11/2010 | Sarkar et al. | 370/342 |
| 7,864,735 B2 * | 1/2011 | Ma et al. | 370/331 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0291420 A1 | 12/2006 | Ng | |

(Continued)

FOREIGN PATENT DOCUMENTS

| | | |
|---|---|---|
| GB | 2452688 | 3/2009 |
| GB | 2482818 | 2/2012 |

(Continued)

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Hassan Kizou
*Assistant Examiner* — Roberta A. Shand
(74) *Attorney, Agent, or Firm* — Fish & Richardson P.C.

(57) ABSTRACT

In general, a method performed on a personal base station includes transmitting a first pilot signal to a portable access terminal operating in an idle mode in a macrocell that uses a first carrier frequency. The first pilot signal is transmitted in the first carrier frequency to allow the portable access terminal to temporarily connect to the first pilot signal. A second pilot signal is transmitted in a second frequency that is different than the first frequency. The portable access terminal is dispelled from the first pilot signal, and the portable access terminal is allowed to connect to the second pilot signal.

24 Claims, 6 Drawing Sheets

(56) References Cited

U.S. PATENT DOCUMENTS

| | | |
|---|---|---|
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0093232 A1* | 4/2009 | Gupta et al. .................. 455/410 |
| 2009/0116445 A1 | 5/2009 | Samar et al. |
| 2009/0129336 A1* | 5/2009 | Osborn ........................ 370/331 |
| 2009/0129341 A1* | 5/2009 | Balasubramanian et al. 370/331 |
| 2009/0132675 A1* | 5/2009 | Horn et al. .................... 709/207 |
| 2009/0156213 A1* | 6/2009 | Spinelli et al. ................. 455/436 |
| 2009/0247156 A1* | 10/2009 | Sampath et al. ............... 455/434 |
| 2010/0015921 A1* | 1/2010 | Yavuz et al. .................. 455/63.1 |
| 2010/0056184 A1* | 3/2010 | Vakil et al. ................... 455/456.5 |
| 2010/0093351 A1* | 4/2010 | Barrett et al. ................. 455/436 |
| 2010/0279686 A1* | 11/2010 | Tokgoz et al. ................ 455/435.1 |
| 2010/0290389 A1 | 11/2010 | Hou et al. |
| 2011/0105110 A1* | 5/2011 | Carmon et al. .............. 455/422.1 |

FOREIGN PATENT DOCUMENTS

| | | |
|---|---|---|
| JP | 2012-527833 | 11/2012 |
| KR | 10-2012-0024778 | 3/2012 |
| WO | WO2010/035150 | 11/2010 |
| WO | WO2010/135258 | 11/2010 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

International Search Report and Written Opinion from PCT application No. PCT/US2010/035150 mailed Aug. 6, 2010, 25 pages.

Samsung, "Inbound mobility to H(e)NBs" 3GPP Draft, Tdoc, R2-093250, 3GPP TSG-RAN WG2 Meeting #66, San Francisco, U.S.A., May 4-8, 2009, 4 pages.

Samsung, "Issues with UE autonomous search function for Home-eNB cells", Tdoc R2-092424, 3GPP TSG-RAN WG2 Meeting #65bis, Seoul, Rep. Korea, Mar. 23-27, 2009, 2 pages.

InterDigital, "Inter-frequency detection of CSG cells", R2-093215, 3GPP TSG-RAN WG2 Meeting #66, San Francisco, May 4-8, 2009, 3 pages.

International Preliminary Report on Patentability from PCT application No. PCT/US2010/035150 mailed Dec. 1, 2011 (8 pages).

\* cited by examiner

MULTI-CARRIER SYSTEM SELECTION

TECHNICAL FIELD

This patent application relates generally to multi-carrier system selection.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and commonly referred to as "access terminals" ("ATs") or user equipment ("UEs"). Examples of ATs or UEs include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

Mobile wireless cellular networks (e.g. UMTS/WCDMA) have been implemented and are in operation globally. However, the coverage of those 2G/3G macro networks is often poor which causes call disruption to customers at home and inside buildings. The home base station (sometimes referred to as Home NodeB ("HNB") or Femtocell Access Points "FAP") is a solution to the indoor coverage problem providing complementary indoor coverage to 2G/3G macro networks for service continuity; moreover, it also acts as a new service platform to enable mobile wireless broadband applications and home entertainment.

A common problem, particularly in UMTS cellular networks is that femto system selection is difficult to achieve when the FAP and a macro network are deployed in different frequency carriers. In high-density urban or suburban areas where the macro signal is particularly strong indoors, the problem can become even more troublesome. One reason for these problems is that when a macrocell currently servicing a UE has a strong signal, it is unlikely that the UE will perform an inter-frequency search and re-select the FAP as its serving node.

SUMMARY

In general, in some aspects, a method performed on a personal base station includes transmitting a first pilot signal to a portable access terminal operating in an idle mode in a macrocell having a first carrier frequency, the first pilot signal being transmitted in the first carrier frequency. The portable access terminal is allowed to temporarily connect to the first pilot signal. The portable access terminal is dispelled from the first pilot signal. The portable access terminal is allowed to connect to a second pilot signal transmitted by the personal base station, the second pilot signal being transmitted in a second carrier frequency.

Aspects can includes one or more of the following features. The first pilot signal alternates between a first state and a second state. The first state prevents the portable access terminal from connecting to the first pilot signal, and the second state allows the portable access terminal to connect to the first pilot signal. The portable access terminal operates in a Universal Mobile Telecommunications System. The personal base station transmits information that prevents the portable access terminal from re-connecting with the macrocell. The second pilot signal is populated in a neighboring cell list of the first pilot signal. The first pilot signal has a location area identifier that is the same as a location area identifier of the macrocell.

In general, in some aspects, a method performed on a personal base station includes transmitting a first pilot signal to a portable access terminal operating in an idle mode in a macrocell having a first carrier frequency, the pilot signal being transmitted in the first carrier frequency. The portable access terminal is allowed to temporarily connect to the first pilot signal. Information that forces the portable access terminal to measure inter-frequency cells is transmitted. The portable access terminal is allowed to connect to a second pilot signal transmitted by the personal base station, the second pilot signal being transmitted in a second carrier frequency.

Aspects can include one or more of the following features. The personal base station raises the value of an Sintersearch element. The first pilot signal has a location area identifier that is the same as a location area identifier of the macrocell. The second pilot signal is populated in a neighboring cell list of the first pilot signal. The second pilot signal has a higher transmit power than the first pilot signal. Selecting the second pilot signal is prioritized over selecting the first pilot signal, the second pilot signal having one or more of a higher hierarchical cell structure priority than the first pilot signal and a higher offset than the first pilot signal. The portable access terminal operates in a Universal Mobile Telecommunications System.

In general, in some aspects, a method performed on a personal base station includes transmitting a first pilot signal to a portable access terminal operating in an idle mode within a macrocell having a first carrier frequency, the pilot signal being transmitted in the first carrier frequency. A connection request message is received from the portable access terminal. A connection reject message is transmitted to the portable access terminal, the connection reject message containing information that redirects the portable access terminal to a second carrier frequency. The portable access terminal is allowed to connect to a second pilot signal transmitted by the personal base station, the second pilot signal being transmitted in the second carrier frequency.

Aspects can include one or more of the following features. The first pilot signal has a different location area identifier than a location area identifier of the macrocell. The second pilot signal is populated in a neighboring cell list of the first pilot signal. The portable access terminal operates in a Universal Mobile Telecommunications System.

The details of one or more embodiments are set forth in the accompanying drawings and the description below. Other features and advantages will be apparent from the description and drawings, and from the claims.

DETAILED DESCRIPTION

Figure 1:
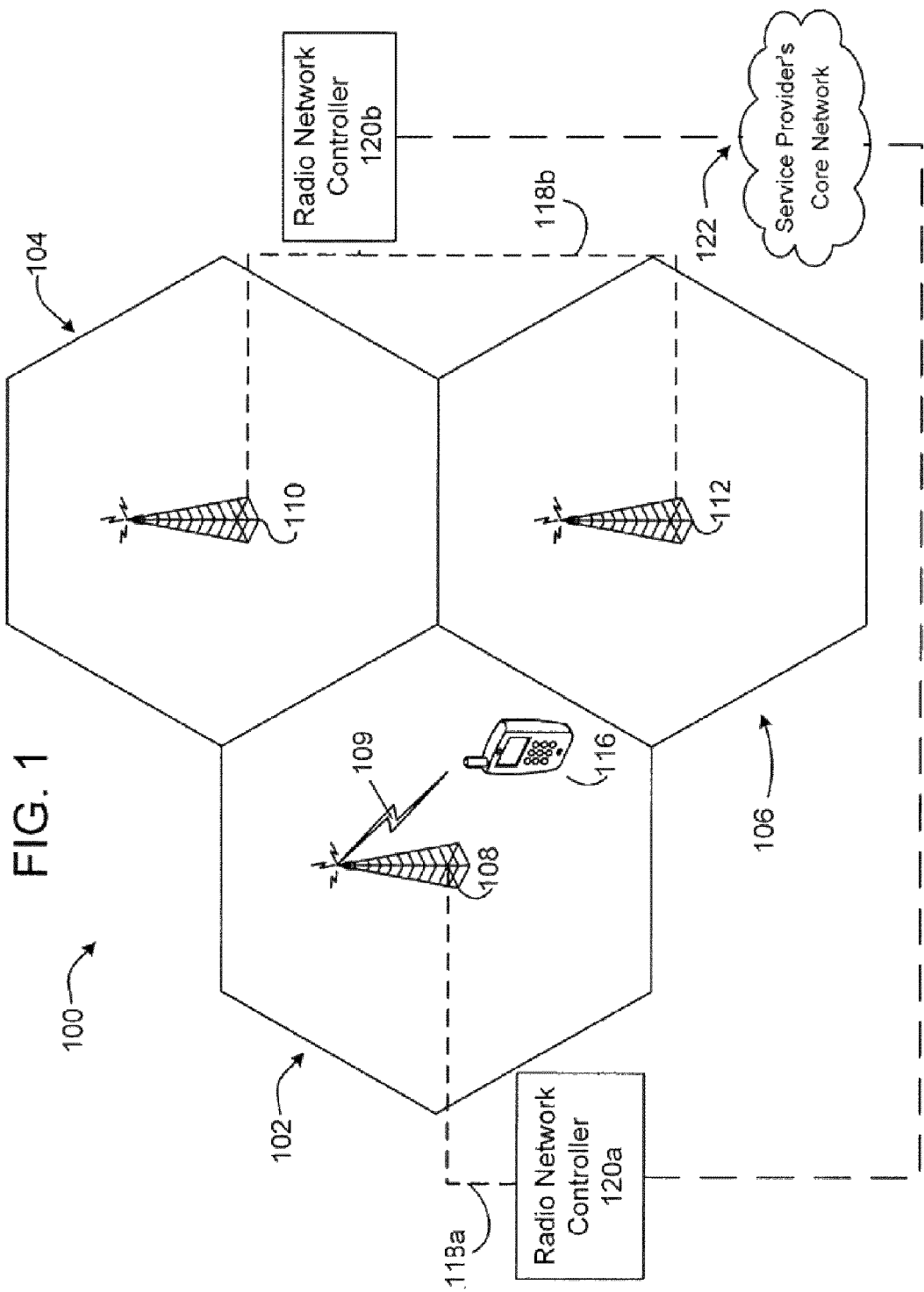
FIG. 1 is a diagram of a radio access network (RAN).

In wireless communication networks generally, geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell" or "macro base station." Within a macrocell area, one or more access points may be located to serve smaller geographic areas, referred to as "femtocell areas." An access point that serves a femtocell area is referred to as a "femtocell access point" (FAP). A macrocell, for example, may provide coverage to an area of a few blocks, while a femtocell access point may provide coverage to an area covering the interior or vicinity of a vehicle, or spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor which may cause, e.g., service disruption (e.g., a dropped telephone call) to users of mobile terminals (User Equipment—UEs) at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a vehicle, a home, an office, a public space, or a restaurant. For ease of description, private access points will be described hereinafter as femtocell access points or FAPs.

A system selection may be performed for a variety of different reasons. Typically, a system selection occurs when user equipment moves into a different wireless access system. System selection between macrocells and femtocells is a typical type of system selection for the following reasons. A femtocell system selection may occur when a UE camping on a macrocell detects the existence of a neighboring femtocell that has a higher cell ranking than the serving macrocell during the UE cell ranking/evaluation procedure and can provide faster and/or more robust communications with the user equipment than can the current macrocell. For example, the user equipment could be located in closer geographic proximity to the femtocell or there may be fewer obstructions in the communication path between the femtocell and the user equipment. Femtocell system selection may occur whenever a good femtocell signal is detected by the user equipment because it is operator policy to prefer femtocell usage over macrocell.

To facilitate a femtocell system selection, a UE identifies nearby macrocells or femtocells from information provided by the access point which is currently serving the UE. This information, collectively, is referred to as a "neighbor list" and includes scrambling codes assigned to neighboring macrocells and femtocells. The scrambling codes are used in WCDMA to separate transmissions from different access points sharing the same channel frequencies. A neighbor list may also include channel frequencies assigned to neighboring macrocells and femtocells.

In many system selection processes, for example, a UE selects a scrambling code of a nearby access point from the neighbor list received from its current access point. The user equipment uses the scrambling code to measure and evaluate a pilot signal that is continuously transmitted by the nearby access point in order to determine the quality of the neighbor access point of a different access technology. The user equipment may measure and evaluate the current serving access point as well as all neighbor access points of the current serving access point, and compare and rank them against the current serving access point. If the user equipment determines that a neighbor access point has a higher ranking than the current serving access point, it re-selects and starts to camp onto that nearby access point. Otherwise, the user equipment keeps camping on the current access points, and repeats the process until a better-ranked access point is determined.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can cover one or more femtocell access points (FAPs). The macrocells 108, 110, and 112 are each configured to communicate with a UE over an airlink. For example, macrocell 108 communicates with user equipment (UE) 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS), Long Term Evolution (LTE) and Code Division Multiple Access (CDMA) 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1x EV-DO, CDMA2000, WiMax, WiBro, WiFi, and the like.

The following sections of the 3GPP Standard are hereby incorporated by reference in their entirety:

3GPP Technical Specification 25.211 version 5.6.0 Release 5, 2004-09, Physical channels and mapping of transport channels onto physical channels (FDD)

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
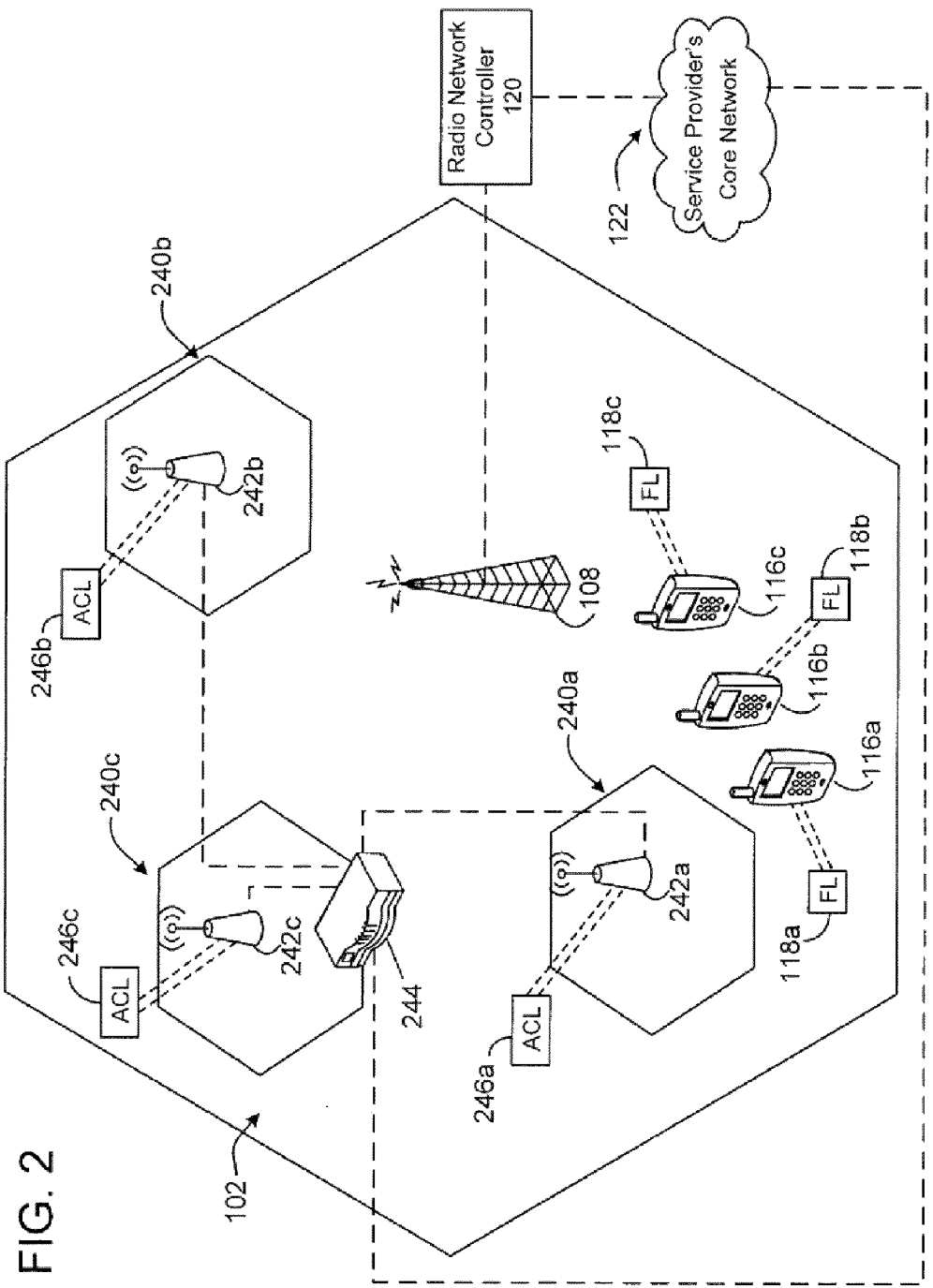
FIG. 2 is a diagram of a femtocell deployment within a macrocell area of the RAN of FIG. 1.

FIG. 2 is a diagram showing a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 (or "network gateway") is in communication with one or more of the FAPs 242a-c. The femtocell server 244 maintains active associations between user equipments such as user equipments (UEs) 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may, in some cases, be a shorthand for a reference to the femtocell server 244, and in some implementations, certain functions of the core network 122 may be included in the femtocell server 244 and vice versa. For example, when reference is made to an FAP accessing stored information from the core network 122, all or part of the information might be stored on the core network 122 and/or the femtocell server 244.

Each of the FAPs 242a-c is generally configured to continuously transmit or broadcast a main pilot signal. The main pilot for an FAP is decoded with a main scrambling code assigned to that particular FAP. The terms "main scrambling code" and "main pilot" may also be referred to as "operating/primary scrambling code" and "operating/primary pilot," respectively. The FAPs' main scrambling codes may be assigned with maximum geographic dispersal in order to minimize radio interference probability (given that a limited set of main scrambling codes for FAPs may be reused within a macrocell area in a dense deployment). The main scrambling codes assigned to the FAPs 242a-c may be stored in the neighbor list of the macrocell 108.

Femtocell access point systems typically perform some type of closed access control. Closed access control can mean the access to each femtocell access point is limited in some fashion (e.g., not every user equipment may "camp" on the femtocell and/or utilize the services of the femtocell). For example, an owner of an FAP may wish to control which user equipments are allowed to camp on and register with the core network 122 via the FAP to use normal service (e.g., non-emergency service).

User equipments may be "authorized" or "not authorized" ("unauthorized") to camp on and/or use services of an FAP. Each FAP of the FAPs 242a-c may include an authorization list, or "access control list," which may be stored in memory on the FAP (see, e.g., access control lists (ACLs) 246a, 246b, 246c stored on respective FAPs 242a, 242b, 242c in FIG. 2). The access control list for a particular FAP includes identities of UEs that are authorized on that FAP. Access control lists may be updated periodically by an administrator or operator of the core network (e.g., the core network 122). UEs that are not identified on the access control list of a particular FAP are not authorized on that FAP. A particular UE may be authorized on one FAP and unauthorized on another FAP. From the perspective of an FAP, a UE is either an authorized user equipment (AUE) or an unauthorized user equipment (UUE). From the perspective of a UE, an FAP is either an authorized FAP (e.g., a "home" FAP that the UE is authorized on), or an unauthorized FAP (e.g., a "foreign" FAP that the UE is not authorized on).

A home FAP may be located in a user's home, in an office building, or in some other public or private location. Likewise, a "foreign" FAP may be located in close physical proximity to a user's home FAP but still be foreign from the perspective of the UE. Just as an FAP may identify more than one authorized UE in its access control list, a UE may be authorized on more than one FAP (and thus may have more than one authorized FAP or home FAP). For ease of description, a home FAP for a UE will be referred to as though it is the only home FAP for the user equipment.

Since an access control list of an FAP may change from time to time, a particular UE may change from being an authorized UE (AUE) at one point in time to being an unauthorized UE (UUE) for that FAP. Similarly, from the perspective of the "changing" UE, what was once an authorized FAP (e.g., a "home" FAP) when the UE was an AUE for that FAP, becomes an unauthorized FAP (e.g., a "foreign" FAP") when the UE becomes a UUE for that same FAP.

In portions of the following description, the UE 116a is referred to as being an authorized UE on the FAP 242a, and the FAP 242a is referred to as being a home FAP for, or from the perspective of, the UE 116a. At the same time, the UE 116a is referred to as being an unauthorized UE with respect to the FAP 242b, and the FAP 242b is referred to as being a foreign FAP for, or from the perspective of, the UE 116a. In analogous fashion, the UE 116b is referred to as being an authorized UE on the FAP 242b and an unauthorized UE on the FAP 242a. References to UEs 116a-c as authorized UEs and/or unauthorized UEs and FAPs 242a-c as home FAPs and/or foreign FAPs are merely examples. Thus, in some examples, the FAPs 242a, 242b, and 242c may be home FAPs for one or more UEs and may simultaneously be foreign FAPs for one or more other UEs. The UEs 116a-c may be authorized UEs for one or more FAPs and may simultaneously be unauthorized UEs for one or more other FAPs.

Examples of UE identifiers that may be used in an access control list on a particular FAP may include the International Mobile Subscriber Identity (IMSI) of the UE. While the UE may also use a temporary identifier such as a Temporary Mobile Subscriber Identity (TMSI) in initial communications with an FAP, access control lists may generally include the unique IMSI of the UE rather than the TMSI.

In a wireless network such as a UMTS network, each access point is assigned an access point identifier such as a Location Area Identifier. Location Area Identifiers are explained in more detail in 3GPP Technical Specification 23.003, section 4.4.4.6. The Location Area Identifier (LAI) of the access point is broadcast to UEs. When camping on an access point, the UE issues a Location Area Update (LAU) Request message that contains the LAI assigned to that access point. That Location Area Update Request message is forwarded by the access point to the core network and the core network returns a message to the UE that allows that UE to camp on the access point to use normal service (e.g., non-emergency service) or that rejects the UE's Location Area Update Request to disable normal service (unless the UE is trying to make an emergency call from the FAP). Once camped on an access point with a particular LAI, the UE can move into the coverage area of another access point with the same LAI without issuing a new Location Area Update Request. The UE issues a new Location Area Update Request message when the UE moves into the coverage area of an access point with a different LAI. The UE may also issue the Location Area Update Request periodically to inform an access point that the UE is still in the vicinity of the access point.

An LAI is an example of an access point identifier. In some examples, wireless networks that use other air interface standards may use an access point identifier other than an LAI in access control.

When a UE moves into the coverage area of an FAP, the UE will generally issue a Location Area Update Request message containing the LAI assigned to that FAP. Thus, even a UE that is unauthorized on a particular FAP but that is in range of, or in the coverage area of, the FAP will generally attempt to camp on the FAP and do Location Area registration with the core network (e.g., core network 122) using the Location Area Update Request message. In order to support a form of closed access control, Location Area Update Request messages from unauthorized UEs should be rejected to prevent the unauthorized UEs from camping on the FAP to use normal service.

An exemplary system selection performed within system 300 will now be described with reference to FIG. 3. At time $t_1$, UE 302 is operating in "idle mode" and is associated with radio node (RN) 304, which is a network element of a macro network. In an idle mode, the UE may implement cell selection and reselection procedures, and the UE may be registered on the network. Furthermore, in an idle mode, the UE may listen for paging messages, and will perform location area updates when necessary. The idle state in GRPS indicates that the UE has not yet registered onto the network or is switched off.

In this example, the UE 302 moves away from RN 304 in the direction of the FAP 306, which may be installed in a user's home, office, or other location. Certain parameters received on UE 302 and the pilot signal quality of the current RN 304 measured by the UE 302 cause the UE 302 to begin measuring characteristics of adjacent cells (e.g., if the signal quality of the current serving cell drops below a certain threshold). For example, UE 302 performs measurements such as cell search, signal strength measurement, and evaluation/ranking. The measurements can be periodic, or can be based on other factors, such as whether the macro cell is experiencing interference. As part of the measurements, UE 302 attempts to detect the presence of other cells.

A problem may arise approximately at time $t_2$ when the UE 302 arrives within a certain proximity of FAP 306. For example, if FAP 306 is located in a home belonging to a user of UE 302, it may be desirable for UE 302 to "jump" to the cell associated with FAP 306. This femto system selection becomes difficult to achieve when the FAP 306 and the macro network associated with RN 304 are deployed in different frequency carriers. The problem may be exacerbated in high-density areas because the signal from the macro cell may be strong both indoors and outdoors (e.g., in urban areas). One reason for the femto system selection problem is that when the current macro signal is strong, it is less likely that the UE 302 will perform an inter-frequency search and re-select the cell associated with FAP 306.

As described above, FAPs (such as FAP 306 and FAPs 242a-c shown in FIG. 2) are generally configured to continuously transmit or broadcast a main pilot signal or "service pilot" ("SP"). However, in some implementations, FAPs may also be configured to transmit a second pilot signal concurrently with the main pilot. This second pilot signal is designated the "greeting pilot" ("GP"). In FAP deployments that include greeting pilots, each single FAP may be referred to as including a "femtocell access point service cell" and a coupled "femtocell access point greeting pilot" ("FAP GP"). The present disclosure relates to a number of techniques that use a pilot GP transmitted from FAP 306 to facilitate system selection between cells using different carrier frequencies, e.g., between the cell associated with RN 304 and the cell associated with FAP 306.

The FAP 306 includes a GP 310 and an SP 312. For the FAP 306, the GP 310 may be thought of as a greeting pilot signal broadcast by the FAP 306 on an antenna, and/or, e.g., more general greeting pilot capabilit(ies) or functionalit(ies) respectively included on the FAP 306. Thus, the FAP 306 may broadcast the GP 310, and/or may include the FAP GP 310. Similarly, for the FAP 306, the SP 312 may be thought of as a main pilot signal broadcast by the FAP 306, and/or, e.g., more general service cell capabilit(ies) or functionalit(ies) respectively included on the FAP 306. Thus, e.g., the SP 312 may perform actions such as communicating with or exchanging messages with a UE such as Location Area Update messages, and/or may itself represent an additional broadcast channel that may carry or include information or messages such as such as neighbor list information or Location Area Update messages. In some implementations, the SP 312 is configured to communicate with a core network (not shown) via, e.g., a femtocell server, and, e.g., set up registrations of UEs with the core network. In addition, the SP 312 may be configured to provide services such as telephone call service to a UE.

On the other hand, the GP 310 may sometimes be configured to facilitate a Location Area Update (LAU) message exchange with a UE, but is generally not configured to communicate with a core network or to provide any FAP services to a UE beyond closed access control related functions. In this example, however, the GP 310 does not have the ability to receive messages from UE 302 as it only contains a transmitter. Because the LAU message exchange would require GP 310 to be able to receive messages from the UE 302, the occurrence of LAU between UE 302 and GP 310 should be avoided. To prevent LAU message exchange, GP 310 may be assigned the same LAI as the macrocell. Location area updating is a procedure used to ensure that the network knows the location of the UE when the UE is in an idle state. In this state, the UE does not have an active signaling connection to the network, but nevertheless the network is responsible for tracking the location of the UE. For example, the UE can decode a broadcasted location area identifier of the UE's current cell, and if the location area identifier changes, due to movement of the UE, then the UE can perform an LAU to notify the network. However, this process would require the network (in this case GP 310) to have the ability to receive messages transmitted from the UE 302. Again, because GP 310 only has transmit functionality in this example, an LAU should be avoided.

Figure 3:
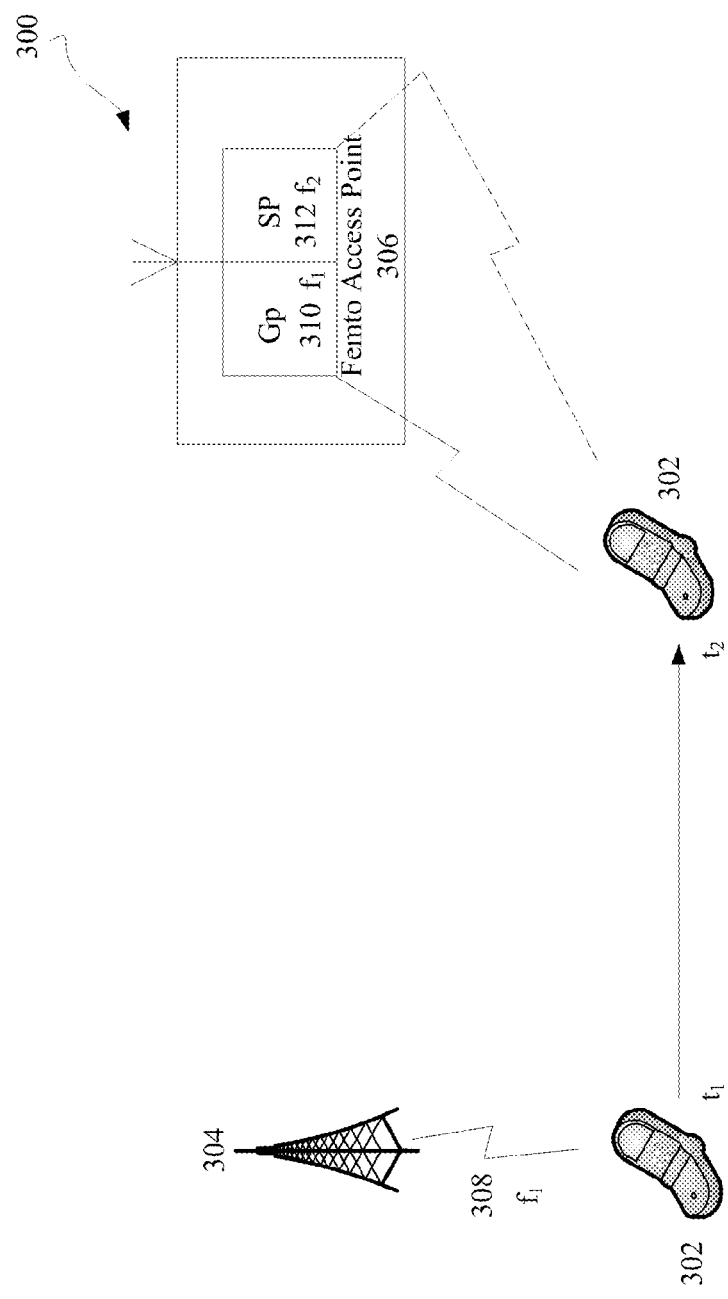
FIG. 3 illustrates an access terminal within a network including one or more femto access points.

In the example of FIG. 3, at time $t_2$, UE 302 begins to detect GP 310. In some examples, GP 310 is in the same carrier frequency ($f_1$) as the macro signal associated with RN 304. GP 310 may have limited functionality (e.g., GP 310 may only be used by FAP 306 to attract a UE to the device). FAP 306 also broadcasts SP 312 in a carrier frequency ($f_2$) that is different than the carrier frequency of the macrocell ($f_1$). In the following examples, UE 302 detects GP 310 and begins to camp on that signal. In order to maintain full service, UE 302 may need to "jump" from the GP 310 (that may only provide limited functionality) to SP 312. A number of techniques are discussed below that enable the UE 302 to quickly and reliably switch from the GP 310 to the SP 312.

Figure 4A:
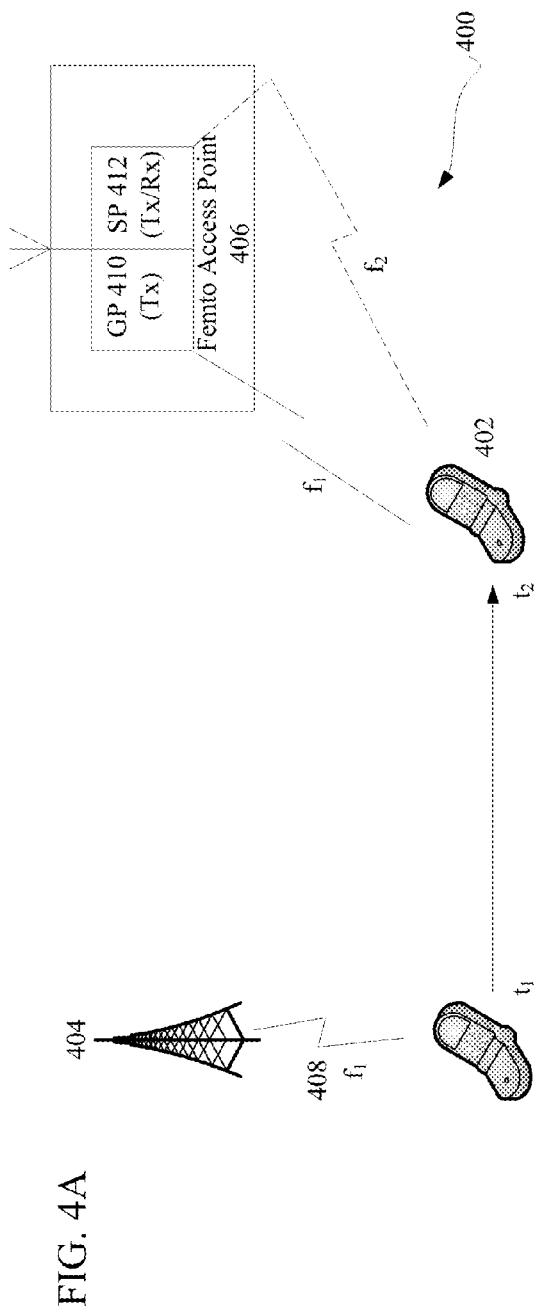
FIGS. 4A and 4B illustrate an access terminal within a network including one or more femto access points and an exemplary representation of a greeting pilot signal.

FIG. 4A illustrates a network architecture that includes FAP 406. In this example, FAP 406 contains both a GP component that provides transmitting functionality (Tx), and an SP component that provides both transmitting and receiving functionality (Tx/Rx) In this example, at time $t_1$, UE 402 is located in the macrocell associated with RN 404, and is camped on carrier frequency $f_1$ broadcasted by RN 404. At time $t_2$, UE 402 detects GP 410 broadcast in the same carrier by FAP 406. Additionally, at time $t_2$, UE 402 may be attracted away from the macro cell associated with RN 404 to the GP 410, as explained below.

Figure 4B:

In some examples, as shown in FIG. 4B, GP 410 may operate in two alternating states: a "barred" state and a "not-barred" state. When GP 410 is in the "not-barred" state, it may attract UEs (such as UE 402) to camp on it. When the GP 410 is in the "barred" state, any UEs camping on GP 410 are dispelled; that is, UEs such as UE 410 are "barred" from locking on to GP 410. In some examples, the "barred" period may be a short period relative to the "not-barred" period. For instance, the "barred" period might be 1-2 seconds, while the "not-barred" period might be 12 seconds. The barred and not-barred states may as explicitly defined by 3GPP specifications as described in this example or, alternatively, may be through other techniques that provide a similar operation but without explicitly barring the cell.

Immediately before each "barred" period, the GP 410 changes its state from "not-barred" to "barred" and the GP 410 sends paging messages to all UEs to trigger a BCCH Info Update (described in more detail below), forcing the UEs to re-read a System Information Block ("SIB"). A particular portion of the SIB, the "SIB3," contains information such as the cell I.D., cell status, and restrictions. For instance, the "Cell Access Restriction" setting contains the information that indicates whether GP 410 is in a "barred" or "not-barred" state. In this case, after re-reading the SIB3, the UE 402 knows that the GP 410 is in a "barred" state and, as a result, the UE must select another cell to camp on.

Regarding the SIB mentioned above, wireless networks broadcast a System Information Message on a broadcast control channel (BCCH). The System Information Message includes a Master Information Block (MIB) and several System Information Blocks (e.g., SIBs 1, 2, 3, 5, 7 and 11). The information in these SIBs helps the UE (mobile station) successfully communicate with the network.

The MIB and SIBs contain configurable parameters, such as those described above. When any of these parameters are changed, the information sent on the BCCH is changed as well. Some of these parameters can not be changed while in active cell operating mode (you must first switch to cell off operating mode). Changing the other parameters causes the FAP to perform a BCCH update procedure if the call status is idle and BCCH Update Page is set to Auto. During a BCCH update procedure, the FAP sends a paging message to the UE indicating that it needs to re-read the BCCH.

As shown in FIG. 4B, after a UE has camped on GP 410 while the signal is in a "not-barred" state, it will soon be dispelled once the state of GP 410 reverts back to a "barred" state. Again, after the UE 402 is dispelled from the GP 410, it will attempt to detect another signal to camp on. Typically, when looking for a new signal to camp on, UE 402 would perform both intra-frequency and inter-frequency searches (searches within the current frequency and outside the current frequency, respectively). In normal operation, UE 402 would perform an intra-frequency search and, upon detecting the strong macro signal from RN 404, it would lock onto signal 408 (broadcast at frequency $f_1$). Because the goal is have UE 402 "jump" to SP 412, and because the signal 408 from the macro cell would normally overpower SP 412, UE 402 must be forced into selecting SP 412 on which to camp.

In some examples, UE 402 can be forced to lock on to SP 412 using the "Intra-frequency cell re-selection indicator" setting. That is, the Intra-frequency cell re-selection indicator is set to a "not allowed" value such that the UE 402 will no longer perform an Intra-frequency search after being dispelled from GP 410. Furthermore, SP 412 may be populated in the inter-frequency neighboring cell list (NCL) of GP 410. This has the effect of limiting the UE's search to an Inter-frequency search, where it will locate the SP 412 (the desired target in this case) in the inter-frequency NCL of GP 410. In this manner, the UE 402 can be forced to select a signal (SP 412) that is broadcast in a different carrier frequency than both GP 410 and the macro signal 408, even if SP 412 is not stronger than either signal. Because SP 412 contains both transmitting and receiving components, UE 402 may be provided full functionality after the UE 402 camps on SP 412.

Referring again to FIG. 3 and FIG. 4A, another exemplary technique for allowing UE 302/402 to quickly and reliably switch from the GP 310/410 to the SP 312/412 will now be described.

Again, in the example of FIG. 3, at time $t_2$, UE 302 begins to detect GP 310. GP 310 is in the same carrier frequency (f1) as the macro signal associated with RN 304, and may have limited functionality (e.g., GP 310 may only be used by FAP 306 to attract a UE to the device). FAP 306 also broadcasts SP 312 in a carrier frequency ($f_2$) that is different than the carrier frequency of the macro cell (f1). UE 302 detects GP 310 and begins to camp on that signal. In order to maintain full service, UE 302 may need to "jump" from the GP 310 (that may only provide limited functionality) to SP 312.

Once UE 302 is camped on GP 310, it must again be enticed to camp on SP 312. In some examples, this can be accomplished by using differential cell re-selection settings in the GP 310 to force the UE 302 to regard the SP 312 as the "most desirable" or "highest ranked" cell.

As before, GP 310 only has transmit functionality, and the GP 310 may again be assigned the same LAI as the macrocell to avoid the occurrence of LAU. Similarly, as in the previous example, SP 312 may be populated in the NCL of GP 310.

In order to persuade the UE 302 to relocate from GP 310 to SP 312, information in the SIB of the GP can be configured to force the UE 302 to detect the presence of SP 312, despite the fact that SP312 may be located in a different carrier frequency than GP 310. In some examples, a value of $S_{intersearch}$ can be set to a high value to force the UE 302 to detect the inter-frequency SP 312 even if the current serving cell quality is still good. The $S_{intersearch}$ parameter controls whether the UE makes measurements of inter-frequency cells while camped. If the quality of the serving cell is above $S_{intersearch}$, then the UE will not measure other inter-frequency cells while camped. If $S_{intersearch}$ is not present, the UE must make inter-frequency measurements while camped. Furthermore, if the UE does not make measurements on other cells, it will not reselect away from the current cell, even if there is another cell at a higher signal level.

In some examples, information in the SIB3 and/or SIB11 can be configured to make the UE 302 regard the SP 312 as the "highest ranked cell" and select SP 312 as a result. There are a number of techniques for altering the rankings of the cells. First, the hierarchical cell structure (HSC) of the SP 312 can be set to a value higher than corresponding values of the GP 310. HCS describes the priority of cells within a mixed environment. That is, when macro, micro, and pico cells may be viewed as candidates for cell reselection, the priority described by the HCS will be used in the associated calculations. When a cell has a higher HCS priority than another cell, this cell shall be regarded as the "higher ranked" regardless of their relative signal qualities. A UE may only need to calculate which cell has a higher ranking according to other factors such as offsets and transmit power levels when the two cells have the same HCS priority.

Secondly, cell individual offsets can also be used to prioritize one cell against another. For example, if a neighbour cell is assigned a much higher offset value than the current cell or if a neighbour cell is assigned a positive offset value whereas the current cell is assigned a negative offset value, it can alter the cell ranking result in favor of that neighbour cell. Additionally, common pilot channel (CPICH) transmit power of the SP 312 can be set higher than that of the GP 310 to further influence the cell rankings. Any one or a combination of these cell reselection techniques may be used to cause a UE to reselect to the desired cell by ranking it as "the highest" during the cell evaluation procedure.

Thus, by forcing the UE 302 to perform an inter-frequency search using the previously-described techniques, it can detect the presence of SP 312 in a different carrier frequency. Furthermore, UE 302 can be made to select SP 312 as its target cell by altering the cell rankings to make SP 312 appear as the "highest ranked" and an attractive target to the UE 302.

Referring again to FIG. 3 and FIG. 4A, similar techniques (e.g. HCS priority, Offset and CPICH power settings) mentioned above can be also used to allow UE 302/402 to quickly and reliably switch from the RN 304/404 to the GP 310/410. Alternatively, when a UE moves close enough to the GP, most likely it will re-select from the macro RN 304/404 to the Femto GP 310/410 based on any default or normal parameter settings in macrocell.

Figure 5A:
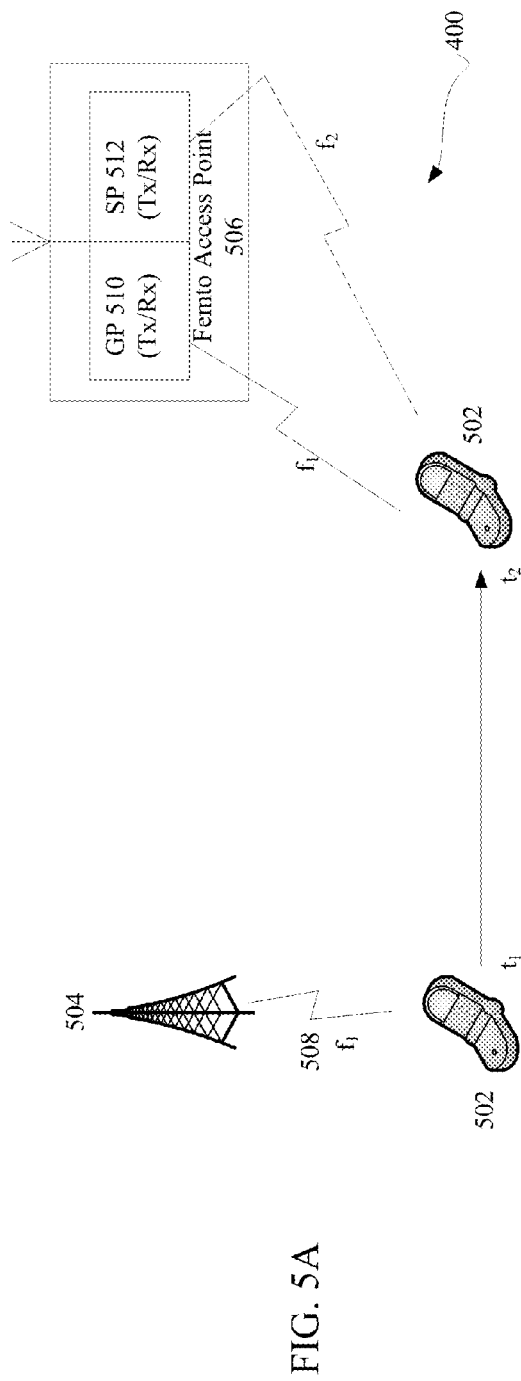
FIGS. 5A and 5B illustrate an access terminal within a network including one or more femto access points and an exemplary timing diagram.
Figure 5B:
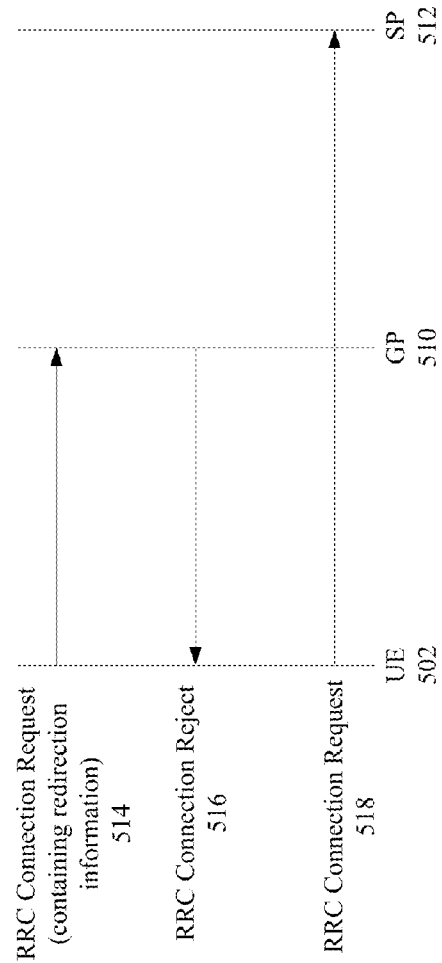

FIGS. 5A and 5B illustrate another exemplary technique for attracting a UE 502 operating in a macrocell containing RN 504 to SP 512 via GP 510. A primary difference between the previously described techniques and the example of FIGS. 5A and 5B is that GP 510 possesses "receiver" functionality. In previous examples, GP 510 was equipped only with the ability to transmit information; however, in the example of FIGS. 5A and 5B, GP 510 comprises a receiver to receive information (e.g., information transmitted from UE 502).

In some examples (and contrary to some of the examples discussed above), the is GP 510 may be assigned an LAI that is different from the LAI of the macrocell in order to trigger an LAU. Again, the SP 514 is populated in the inter-frequency neighbor cell list of the GP 510.

At time $t_2$ the UE 502 detects the GP 510 being broadcast in the same frequency as the macrocell, $f_1$. Once the UE 502 has detected GP 510, the UE transmits a radio resource control (RRC) request message 514 (FIG. 5B) to the GP 510. An RRC connection is a point-to-point bi directional connection between RRC entities on the UE and UTRAN. That is, the UE requires an RRC connection to access the services of the UMTS network.

In response to the RRC request message received from the UE 502 (the GP 510 can receive this request because the GP includes a receiver in this example), the GP 510 transmits an RRC connection reject message 516 (FIG. 5B) back to the UE. The RRC connection reject message may contain "redirection information" that includes the carrier frequency $f_2$—the frequency on which the SP 512 is located. In effect, the GP 510 transmits an alternate destination frequency ($f_2$) to the UE. The redirection information causes the UE 502 to switch from the GP 510 to the SP 512 in a second carrier frequency $f_2$. Finally, the UE 502 transmits a second connection request 518 (FIG. 5B), this time to the SP 512. In this way, the GP 510 can force UE 502 to search on frequency $f_2$ in order to locate and camp on SP 512.

In any of the above examples, it is possible that transmitting the GP in the same carrier frequency as the macrocell ($f_1$, for example) could cause co-channel interference. There are a number of transmission options that can mitigate the problem of co-channel interference between the GP and the macrocell.

A first transmission option is to alternatively turn the GP on and off. When the GP is "off" the interference to the macrocell is minimized or eliminated. On the other hand, when the GP is "on" it can be used to attract a UE from the macrocell to the FAP. Therefore, the first transmission option seeks to use the minimum time possible to complete a system selection (e.g., from macrocell to GP to SP). In fact, macrocells generally have a maximum time limit on the length of time that they will tolerate interference. For example, a timer (e.g, timer "T314") tracks either the radio link failure process or the Radio Link Control (RLC) unrecoverable error process. The value of the timer T314 is broadcasted in the system information by network, and the broadcasted timer value may be stored at a UE. A radio link failure occurs when a UE receives a plurality of consecutive "out of sync" signals from the physical layer, and the mobile device starts the timer T313. If the UE receives successive "in sync" signals from its physical layer before the T313 expires, then the mobile device will stop and reset the T313 timer. If the T313 expires, then the UE enters a "radio link failure" state, in which the UE will clear the dedicated physical channel configuration and perform a cell update procedure. When the T314 timer expires, the UE will enter an idle mode. Therefore, it is useful to complete the system selection in the minimum time possible (e.g., before timer T314 expires).

In some examples, the "off" period of the GP can be configured to be longer than the "on" period of the GP (e.g., GP could be "off" for 1 minute and "on" for 8.32 seconds). As described above, it is useful to have the GP in an "on" state for a time that is less than the T314 timer value (e.g., "on" for less than 12 seconds).

For one interference mitigation option, firstly by radio sniffing, the FAP knows the macro DRX cycle value being used, and how many DRX cycles a UE needs to complete cell measurement and ranking. For example, if macro DRX is equal to 1.28 s, the total time for cell measurement and ranking is 5 DRX cycles (that is, 6.4 s). After the UE finishes the femtocell measurement and ranking and decides to reselect and camp on the FAP, it takes the UE about one FAP DRX cycle to decode and read the FAP SIBs, and two additional FAP DRX cycles to complete paging reception and SIB rereading once the GP cell status is changed from "not-barred" to "barred." Thus, in some examples, three FAP DRX cycles may be needed. Accordingly, if a FAP DRX cycle is 0.64 s, the total time for three FAP DRX cycles would be 1.92 s. Therefore, in this example, the total GP "on" period of 8.32 s would be needed to allow a UE to reselect from macro to GP to SP (this would be the maximum time required).

A second interference mitigation option can further reduce the GP "on" period. For this second option, the FAP also needs to do radio sniffing to obtain macro DRX cycle values. It needs the same part of the GP continuously "on" period for a UE to decode and read GP SIB at the end of the cell evaluation period (e.g., 3 GP DRX cycles). However, instead of being continuously "on" for the whole cell evaluation period as described for the first mitigation option, the GP only needs to intermittently turn "on" during the evaluation period to match the occurrences of the UE actually doing neighbor cell measurements.

In some UE implementations, a UE does neighbor cell measurement at the beginning of every macro DRX cycle, and the measurement duration is approximately 3-5 slots (e.g. in UMTS, 15 slots per 10 ms frame, so 3-5 slots correspond to 2-3.3 ms). Thus, in the second mitigation option, the GP turns on during the cell evaluation period at the timing of each UE neighbor-cell measurement (e.g., the beginning of each macro DRX cycle) for a period of time enough long enough to cover the whole measurement interval (e.g. 5 slots). In this way, the GP continuous "on" period can be further reduced. For example, if macro DRX is equal to 1.28 s and GP DRX is equal to 0.64 s, the continuous "on" period can be further reduced from 8.32 s as in the first mitigation option to only about 1.92 s (i.e. 3 GP DRXs).

Figure 6:
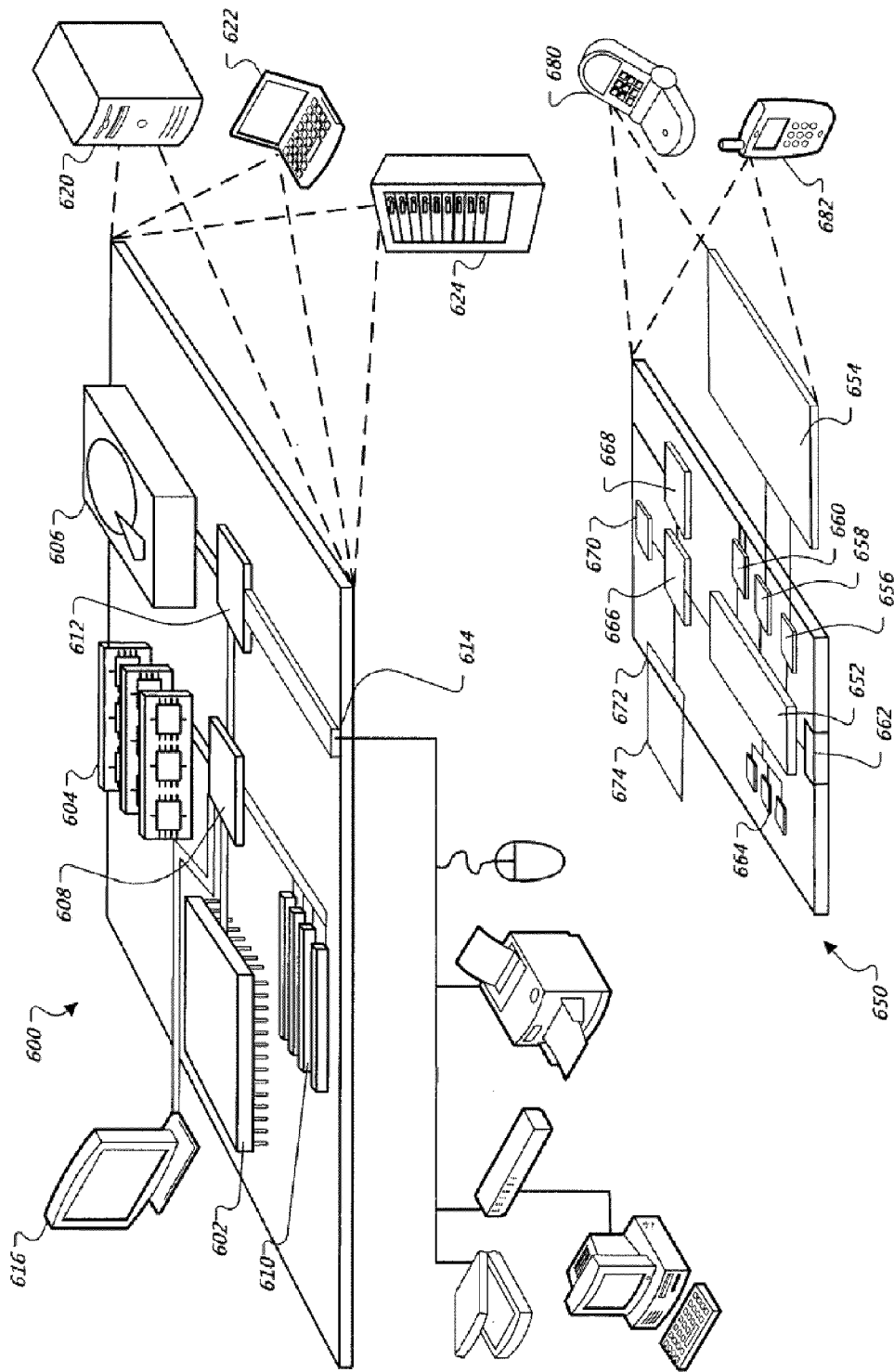
FIG. 6 is a block diagram of computing devices.

FIG. 6 is a block diagram of computing devices 600, 650 that may be used to implement the individual devices and system selection techniques described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, "smartphones," and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory is 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650. Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal. Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. For example, functions that are described as being performed by circuitry could also be performed by various combination of one or more of digital electronic circuitry, integrated circuitry, specially designed ASICs, computer hardware, firmware, or software. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method performed on a personal base station, the method comprising:
    transmitting a first pilot signal to a portable access terminal operating in an idle mode in a macrocell that uses a first carrier frequency, the first pilot signal being transmitted in the first carrier frequency to allow the portable access terminal to temporarily connect to the first pilot signal;
    concurrently transmitting, with the first pilot signal, a second pilot signal in a second frequency that is different than the first frequency;
    intermittently alternating the first pilot signal between a first state and a second state;
    dispelling the portable access terminal from the first pilot signal during the first state; and
    allowing the portable access terminal to connect to the second pilot signal during the first state.

2. The method of claim 1, wherein the first state prevents the portable access terminal from connecting to the first pilot signal, and the second state allows the portable access terminal to connect to the first pilot signal.

3. The method of claim 1, wherein the portable access terminal operates in a Universal Mobile Telecommunications System.

4. The method of claim 1, further comprising transmitting information that prevents the portable access terminal from re-connecting with the macrocell.

5. The method of claim 1, wherein the second pilot signal is populated in a neighboring cell list of the first pilot signal.

6. The method of claim 1, wherein the first pilot signal has a location area identifier that is the same as a location area identifier of the macrocell.

7. A method performed on a personal base station, the method comprising:
    transmitting a first pilot signal to a portable access terminal operating in an idle mode in a macrocell that uses a first carrier frequency, the first pilot signal being transmitted in the first carrier frequency to allow the portable access terminal to temporarily connect to the first pilot signal;
    concurrently transmitting, with the first pilot signal, a second pilot signal in a second frequency that is different than the first frequency;
    transmitting information that forces the portable access terminal to measure inter-frequency cells; and
    allowing the portable access terminal to connect to a second pilot signal.

8. The method of claim 7, wherein the personal base station raises the value of an $S_{intersearch}$ element.

9. The method of claim 7, wherein the first pilot signal has a location area identifier that is the same as a location area identifier of the macrocell.

10. The method of claim 7, wherein the second pilot signal is populated in a neighboring cell list of the first pilot signal.

11. The method of claim 7, wherein the second pilot signal has a higher transmit power than the first pilot signal.

12. The method of claim 7, wherein selecting the second pilot signal is prioritized over selecting the first pilot signal, the second pilot signal having one or more of:
    a higher hierarchical cell structure priority than the first pilot signal; and
    a higher offset than the first pilot signal.

13. The method of claim 7, wherein the portable access terminal operates in a Universal Mobile Telecommunications System.

14. A personal base station comprising:
    a transmitter to:
        transmit a first pilot signal to a portable access terminal operating in an idle mode in a macrocell that uses a first carrier frequency, the first pilot signal being transmitted in the first carrier frequency;
        concurrently transmit, with the first pilot signal, a second pilot signal in a second carrier frequency; and
        intermittently alternating the first pilot signal between a first state and a second state;
    circuitry to allow the portable access terminal to temporarily connect to the first pilot signal;
    circuitry to dispel the portable access terminal from the first pilot signal during the first state; and
    circuitry to allow the portable access terminal to connect to the second pilot signal during the first state.

15. The personal base station of claim 14, wherein the first state is configured to prevent the portable access terminal from connecting to the first pilot signal, and the second state is configured to allow the portable access terminal to connect to the first pilot signal.

16. The personal base station of claim 14, wherein the transmitter is configured to transmit information that prevents the portable access terminal from re-connecting with the macrocell.

17. The personal base station of claim 14, wherein the second pilot signal is populated in a neighboring cell list of the first pilot signal.

18. The personal base station of claim 14, wherein the first pilot signal has a location area identifier that is the same as a location area identifier of the macrocell.

19. A personal base station comprising:
    a transmitter to:
        transmit a first pilot signal to a portable access terminal operating in an idle mode in a macrocell that uses a first carrier frequency, the pilot signal being transmitted in the first carrier frequency;
        concurrently transmit, with the first pilot signal, a second pilot signal in a second carrier frequency; and
        transmit information that forces the portable access terminal to measure inter-frequency cells;
    circuitry to allow the portable access terminal to temporarily connect to the first pilot signal; and
    circuitry to allow the portable access terminal to connect to the second pilot signal.

20. The personal base station of claim 19, further comprising circuitry to increase the value of an $S_{intersearch}$ element.

21. The personal base station of claim 19, wherein the first pilot signal has a location area identifier that is the same as a location area identifier of the macrocell.

22. The personal base station of claim 19, wherein the second pilot signal is populated in a neighboring cell list of the first pilot signal.

23. The personal base station of claim 19, wherein the second pilot signal has a higher transmit power than the first pilot signal.

24. The personal base station of claim 19, wherein selecting the second pilot signal is prioritized over selecting the first pilot signal, the second pilot signal having one or more of:
    a higher hierarchical cell structure priority than the first pilot signal; and
    a higher offset than the first pilot signal.

* * * * *